March 10, 1959
G. W. AMBERG
2,876,907
SORTING DEVICE
Filed May 21, 1956
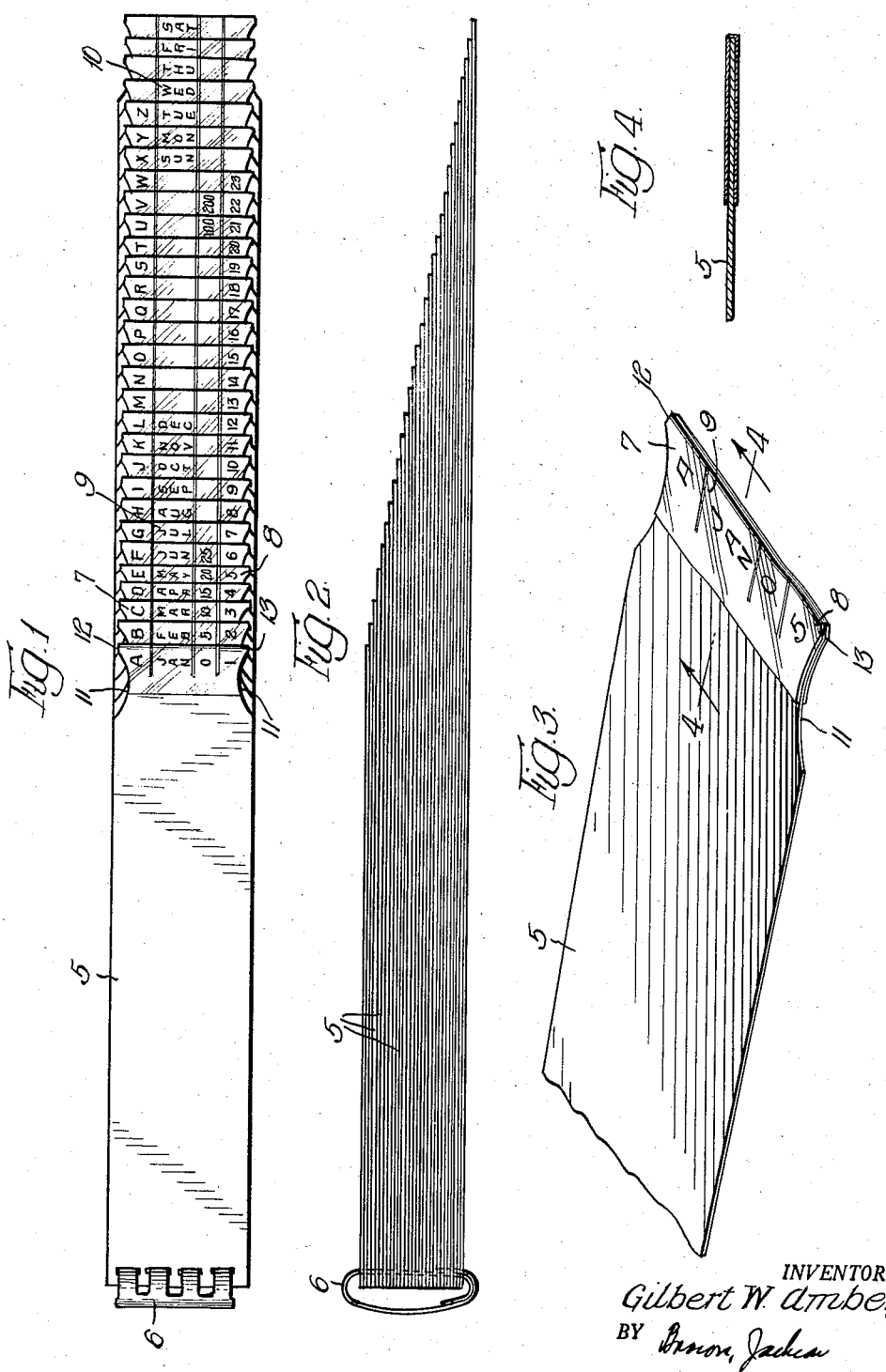
INVENTOR.
Gilbert W. Amberg,
BY United States Patent Office 2,876,907
Patented Mar. 10, 1959

2,876,907
SORTING DEVICE

Gilbert W. Amberg, Kankakee, Ill., assignor to Amberg File & Index Company, Kankakee, Ill., a corporation of Illinois Application May 21, 1956, Serial No. 585,995

2 Claims. (Cl. 211—11)

This invention relates to a sorting device for sorting checks, statements, correspondence, invoices and many other like sheets.

Briefly, the sorting device to which this invention pertains comprises a plurality of superposed leaves or sheets hinged together at one end, the leaves being of relatively narrow width and each of the leaves from top to bottom of the superposed pack being of progressively greater length. These leaves form, in effect, what might be termed "pockets" for receiving the sorted matter therebetween. The leaves may be alphabetically or numerically indexed, or indexed by Month, Day or Date, or otherwise. In use of the device, the proper leaf is selected and lifted about its hinge and the correspondence or other material inserted thereunder.

Heretofore, the free ends of the leaves have been of a square cut or of an inwardly tapered formation. This rendered it difficult and troublesome to select and lift a single leaf between the fingers of the hand, as more often than not a plurality of leaves were grasped, which then had to be, in effect, sorted out to obtain the desired leaf. Obviously, this did not provide for rapid and efficient use of the device and resort was had to slipping the finger nail under the desired leaf to raise it, a practice to which many objected.

Broadly, the principal object of the present invention resides in the provision of a device of the character described having the free ends of the leaves thereof so formed as to facilitate the separation and raising of a desired leaf, to the exclusion of others, thereby providing for more expeditious use of the device.

Specifically, the invention aims to provide, in a manner as hereinafter set forth, a sorting device comprising a plurality of superposed leaves hinged together at one end, the leaves from top to bottom of the pack being of progressively greater length, with each leaf having provisions at its free end to permit it to be grasped between the thumb and index finger of the hand, thereby to facilitate the independent separation and raising of a selected leaf, to the exclusion of others of the leaves.

Other objects and advantages of the invention will in part be obvious and in part will hereinafter appear, and they consist generally in the features of construction, combinations of elements and arrangements of parts, which will be exemplified in the construction to be described and of which the scope of application will be indicated in the appended claims.

In the accompanying drawings in which is shown the preferred illustrative embodiments of the invention:

Figure 1 is a plan view of a sorting device embodying the principles of the present invention;

Figure 2 is a side elevational view of the device of Figure 1;

Figure 3 is a fragmentary perspective view of a single leaf of the device of Figures 1 and 2, showing the novel formation of the free end of the leaf; and Figure 4 is a fragmentary vertical sectional view taken substantially along the plane of the line 4—4 of Figure 3.

Referring now in detail to the drawing: the sorting device of the present invention comprises a plurality of longitudinally elongated superposed leaves 5, hingedly connected together at one end thereof by the hinge 6. The leaves are of relatively narrow width as compared to their length and, from the top to the bottom of the pack, the leaves are of progressively greater length so that each leaf will project outwardly for a short distance beyond its preceding leaf. The amount of projection of each leaf will be hereinafter described. Conveniently, the leaves may be formed of a relatively stiff, but withal flexible cardboard. The upper surface of the free ends of the leaves may be indexed alphabetically or numerically, as indicated at 7 and 8, respectively, or by Month or Day, as indicated at 9, 10, respectively, etc.

As shown, adjacent its free end, each of the leaves has its opposite longitudinal marginal edges provided with a concave recess 11 extending into the body of the leaf. These recesses are large enough to partially receive the finger of a hand and define opposed tabs 12—13. The length of each leaf is such that the tabs 12—13 of one leaf will lie substantially centrally of the recess of the next succeeding leaf. Thus, by reason of the recess 11, the tabs 12—13 of a leaf may be grasped between the thumb and index finger of the hand, without such thumb and index finger encountering the next succeeding leaf.

In use, the sorter is placed in position on the desk to lift leafs 5 by tabs 12—13 of the left hand. Papers to be sorted are placed at the right hand and dropped under leaf by the right hand. When the sorter is filled to capacity, or with all the papers to be sorted, the sorter is then held down with the left hand, the right hand grasping the papers and, when possible, removing all papers with one motion so that they will remain in sorted order.

While a preferred embodiment of the invention has been illustrated and described by way of example, it will be obvious that changes may be made therein within the spirit and scope of the invention. For example, the leaves may all be of the same length and individually hinged to a base structure to project outwardly from a preceding leaf a sufficient distance to obtain the desirable effect described above. Therefore, the invention is not to be limited to the precise form herein disclosed, except insofar as it may so be limited by the appended claims.

I claim:

1. A sorting device of the character described comprising a pack of longitudinally elongated superposed leaves with the leaves from the top to the bottom of the pack projecting for a short distance beyond the outer edge of a preceding leaf, each of said leaves adjacent one end thereof having its opposite longitudinal marginal edges provided with a recess defining a pair of opposed tabs adjacent the free end of the leaf and within the longitudinal marginal edges thereof, the length of said leaves being such that said pair of tabs of one leaf will be positioned to centrally overlie the recess of the next succeeding leaf with a portion of said recess extending longitudinally behind and before said tab, and means hingedly securing the opposite ends of said leaves.

2. A sorting device of the character described comprising a pack of longitudinally elongated superposed leaves with the leaves from the top to the bottom of the pack being of progressively greater length, each of said leaves adjacent one end thereof having its opposite longitudinal marginal edges provided with a concave recess defining a pair of opposed tabs at the free end of the leaf and within the longitudinal marginal edges thereof, the length of said leaves being such that said pair of tabs of one leaf will be positioned substantially centrally of the concave recess of the next succeeding leaf with a portion of said recess extending longitudinally behind and before said tab, and means hingedly securing the opposite ends of said leaves together.

References Cited in the file of this patent

UNITED STATES PATENTS

| | | |
|---|---|---|
| 511,339 | Livesey | Dec. 26, 1893 |
| 648,476 | Wiley | May 1, 1900 |
| 744,350 | Jewell | Nov. 17, 1903 |